United States Patent [19]
Lee, Jr. et al.

[11] Patent Number: 4,532,281
[45] Date of Patent: Jul. 30, 1985

[54] MINERAL FILLED POLYPHENYLENE ETHER RESIN COMPOSITIONS CONTAINING POLYTETRAFLUOROETHYLENE RESIN

[75] Inventors: Gim F. Lee, Jr., Albany; Robert A. Williams, Selkirk, both of N.Y.

[73] Assignee: General Electric Company, Pittsfield, Mass.

[21] Appl. No.: 556,014

[22] Filed: Nov. 29, 1983

Related U.S. Application Data

[63] Continuation of Ser. No. 347,077, Feb. 8, 1982, abandoned.

[51] Int. Cl.$^3$ .......................... C08K 3/10; C08K 3/00; C08L 71/04
[52] U.S. Cl. ................................. 524/141; 524/420; 524/423; 524/425; 524/451; 524/505; 524/508; 525/92; 525/133

[58] Field of Search ............... 524/508, 451, 141, 423, 524/420, 425, 505; 525/133, 92

[56] References Cited

U.S. PATENT DOCUMENTS

| 4,131,598 | 12/1978 | Abolins et al. | 524/508 |
| 4,332,714 | 6/1982 | Haaf et al. | 524/141 |
| 4,339,376 | 7/1982 | Kasahara et al. | 524/116 |

Primary Examiner—Wilbert J. Briggs, Sr.
Attorney, Agent, or Firm—Hedman, Gibson, Costigan & Hoare

[57] ABSTRACT

Thermoplastic materials having a combination of good stiffness and good impact strength are described. These are blends of a polyphenylene ether resin, an impact modifier, a mineral filler, and a small amount of polytetrafluoroethylene resin effective to further enhance the impact strength of the blend.

12 Claims, No Drawings

MINERAL FILLED POLYPHENYLENE ETHER RESIN COMPOSITIONS CONTAINING POLYTETRAFLUOROETHYLENE RESIN

This is a continuation of application Ser. No. 347,077 filed Feb. 8, 1982, now abandoned.

BACKGROUND OF THE INVENTION

The term "polyphenylene ether resin" is well known as defining a class of thermoplastic materials which possess outstanding physical properties, including hydrolytic stability, dimensional stability and excellent dielectric characteristics. Methods of preparation are known in the art and described in the patent literature, e.g., Hay, U.S. Pat. Nos. 3,306,874, and 3,306,875 and Stamatoff, U.S. Pat. Nos. 3,257,357 and 3,257,358, incorporated herein by reference to save unnecessary detail. Other patents which show the preparation of polyphenylene ether resins include Bennett and Cooper, U.S. Pat. Nos. 3,369,656 and 3,838,102, as well as Cooper and Bennett, U.S. Pat. Nos. 3,642,699, 3,661,849 and 3,733,299, also incorporated herein by reference.

It is known that when the polyphenylene ether resins are combined with polystyrene, the resulting compositions possess properties which are improved over the corresponding properties of either resin alone. See Cizek, U.S. Pat. Nos. 3,383,435, the disclosure of which is incorporated herein by reference.

A shortcoming of these thermoplastic materials is their relatively poor resistance to electrical arcing. Such arcing is most conveniently quantized by the related parameter of tracking (often referred to as "arc tracking") resistance. It measures, for example, the ability of the thermoplastic composition to withstand extreme electrical stresses through the rate of formation of a carbonized path or track as two charged electrodes are drawn apart on its surface. Poor arc tracking resistance is especially undesirable for thermoplastic materials employed as electronic equipment components and housings.

It is known that the arc/tracking resistance of certain polymeric compositions may be improved through the incorporation of mineral fillers. It has recently been proposed that talc, in particular, when employed as a filler for a polyphenylene ether composition provides considerable improvement in the arc tracking rate. This development is described in application Ser. No. 304,947 filed Sept. 23, 1981, assigned to the same assignee as herein.

Mineral fillers in general decrease the impact strength of polyphenylene ether compositions, however. This is a significant problem in the case of recently developed arc track resistant materials such as those referred to above because, in addition to increased arc tracking, good impact strength is also a desirable property for the compositions.

INTRODUCTION TO THE INVENTION

The discovery has now been made that the impact strength of mineral filled polyphenylene ether resin thermoplastic molding compositions is improved by the incorporation of a minor but effective amount of polytetrafluoroethylene resin.

It has further been discovered that with the addition of polytetrafluoroethylene resin, not only does the impact strength increase but also the flexural modulus and strength of the compositions are also improved. This is particularly advantageous for applications where greater stiffness is necessary such as in thin-walled section moldings.

DESCRIPTION OF THE INVENTION

Any of the polyphenylene ether resins are suitable for use in the invention. As previously indicated, such resins are well known and readily available. There are, however, preferred composition components and these are homo- and copolymers having the formula

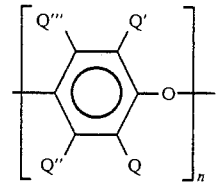

wherein Q, Q', Q" and Q"', are independently selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and the phenol nucleus, and Q', Q" and Q"' in addition may be halogen with the proviso that Q and Q' are preferably free of a tertiary carbon atom; and n represents the total number of monomer residues and is an integer of at least 50.

Especially preferred is poly(2,6-dimethyl-1,4-phenylene) ether.

The polyphenylene ether resins can be prepared by procedures described in the above-mentioned patents.

The polyphenylene ether resin is preferably in admixture with one or more polymeric impact modifiers. The impact modifier can be a styrene homopolymer in admixture or otherwise modified with an elastomeric material such as a natural or synthetic rubber, or a styrene containing elastomeric copolymeric or terpolymer.

By way of illustration, the impact modifier may be a homopolymer such as polystyrene, polychlorostyrene, poly(alpha-methyl styrene), or poly(para-methyl styrene) which has been modified by natural or synthetic rubber, for example, polybutadiene, polyisoprene, butyl rubber, EPDM rubber, natural rubber, polysulfide rubbers, polyurethane rubbers, etc., elastomeric styrene copolymers such as styrene-butadiene copolymers, styrene-acrylonitrile-butadiene-terpolymers (ABS), block copolymers of styrene and a diene in their various forms, for example, A-B, A-B-A, A-B-AB, A-B-A-B-A, etc., random or radial teleblock copolymers of these same materials, as well as hydrogenated forms of the linear, random and radial copolymers in which the aliphatic unsaturation, e.g., of the "B" (diene) block has been reduced; and admixtures of any of the above mentioned styrene homopolymers with any of the above mentioned elastomeric styrene co- and terpolymers.

Blends of the polyphenylene ether resin and impact modifier can contain these materials in virtually any desired proportion, e.g., from 20:1 to 1:2 parts by weight.

The mineral fillers are also individually well known and readily available. The mineral component can be selected, for instance, from among talc, clay, zinc oxide, titanium dioxide, barium sulfate, calcium carbonate, zinc sulfide, as well as any of the other materials suitable for use as fillers with polyphenylene ether resin.

Special mention is made of talc because of its effectiveness in reducing the UL arc/tracking rate of thermoplastic compositions (referring to the Underwriters Laboratories standard test procedure entitled "High Voltage Arc/Tracking Rate"; rates are desirably less than 1 inch/minute).

To achieve the desired arc/tracking rates it is preferred to employ the mineral filler in an amount of at least about 40% by total composition weight, and usually from 40% to 60%.

The polytetrafluoroethylene resins preferably are microfibrillar materials, which are commercially available or can be prepared by known processes. They are normally white solids which are obtained, for instance, by polymerizing tetrafluoroethylene in aqueous media in the presence of a free radical catalyst at a pressure from 100 to 1,000 psi and a temperature from 0° to 200° C. A preferred commercial material is DuPont's Teflon 6.

The polytetrafluoroethylene resin is included in minor but effective amounts to achieve the described benefits. Usually, amounts of from 0.1 to 10 parts by weight based on the total composition are sufficient and these are preferred.

The composition can and also usually do contain other ingredients, and particularly non-resinous agents typically present in polyphenylene ether resin molding compositions to improve other physical and chemical properties of the moldings. These agents include flame retardants, plasticizers, antioxidants, strengthening fibers (for example, glass fibers and graphite whiskers), dyes and pigments.

The polyphenylene ether resins are known to be homogeneously admixable with elastomeric materials such as the modifiers described above in virtually all proportions. Preferably, however, the polyphenylene ether and impact modifier are present in a weight ratio within the range 25:1 to 1:2.

The supplementary non-resinous agents are present in total amount between about 1% and 20%, so as to provide the benefits which these materials have conferred in the past on shaped molded articles made from thermoplastic resins.

The present kinds of compositions can be prepared by any of a number of known procedures. In one such procedure, the ingredients are tumbled or mechanically stirred to form a preblend, the preblend is passed through an extruder at an elevated temperature, the extrudate is cooled and cut or ground into particles which are then fed to an injection molding device.

The following examples are given by way of illustration only and are not intended as a limitation on the scope of this invention. Unless otherwise specified herein, all proportions are provided on a weight basis.

EXAMPLES

Compositions according to the invention were prepared using poly(2,6-dimethyl-1,4-phenylene ether) resin (PPO, General Electric Co.), hydrogenated styrene-butadiene-styrene block copolymer (Shell's Kraton G1652 resin), talc (Englehard's EMTAL 599), triphenyl phosphate flame retardant/plasticizer, isopropylated triphenyl phosphate (FMC's Kronitex 50) stabilizer/flame retardant and microfibrillar polytetrafluoroethylene resin (DuPont's Teflon 6), in the amounts noted below.

The ingredients were blended, passed through a single screw Brabender or twin screw Werner-Pfleiderer extruder at 450° F., and molded into test bars at an injection temperature of 440° F.

The compositions and test results are set forth in the Tables below.

TABLE

| Composition No. | COMPOSITION | | | | | |
|---|---|---|---|---|---|---|
| | PPO | K-50 | TPP | KG1652 | EMTAL 599 | T-6 |
| Control | 60 | 20 | 20 | 10 | 43 | — |
| 1 | 60 | 20 | 20 | 10 | 43 | 1.0 |
| 2 | 60 | 20 | 20 | 10 | 43 | 2.0 |
| 3 | 60 | 20 | 20 | 10 | 43 | 5.0 |

| Composition No. | PROPERTIES | | | | | | |
|---|---|---|---|---|---|---|---|
| | TY | TS | TE | Izod | Gard | FM | FS |
| Control | 4.0 | 3.5 | 55 | 1.1 | 150 | 304 | 6.2 |
| 1 | 4.2 | 3.6 | 49 | 1.9 | 150 | 329 | 6.2 |
| 2 | 4.2 | 3.7 | 55 | 2.4 | 150 | 410 | 6.4 |
| 3 | 4.8 | 4.1 | 56 | 2.1 | 170 | 437 | 6.7 |

In the foregoing Table, the abbreviations for the properties designate the following:

TY = Tensile yield strength, $psi \times 10^{-3}$
TS = Tensile strength, $psi \times 10^{-3}$
TE = Tensile elongation, %
Izod = Izod impact strength, ft.lbs./in. of notch
Gard = Gardner impact strength, in. lbs.
FM = Flexural modulus, $psi \times 10^{-3}$
FS = Flexural strength, $psi \times 10^{-3}$ All of the foregoing patents and/or publications are incorporated herein by reference. Obviously other modifications and variations of the present invention are possible in light of the above teachings. For instance, instead of poly(2,6-dimethyl-1,4-phenylene) ether, there can be used a copolymer such as poly(2,6-dimethyl-co-2,3,6-trimethyl-1,4-phenylene) ether. The compositions can also include other ingredients such as one or more of the non-resinous modifying agents mentioned above. It is, therefore, to be understood that changes may be made in the particular embodiments of the invention described which are within the full intended scope of the invention as defined by the appended claims.

We claim:

1. A thermoplastic composition, comprising an intimate admixture of
   (a) a blend of a polyphenylene ether resin, an impact modifier and a mineral filler; and
   (b) a notched Izod impact strength enhancing amount of a polytetrafluoroethylene resin.

2. A composition according to claim 1, in which the polyphenylene ether resin is poly(2,6-dimethyl-1,4-phenylene ether).

3. A composition according to claim 1, in which the impact modifier is a block copolymer of styrene and butadiene.

4. A composition according to claim 1, in which the butadiene has been hydrogenated.

5. A composition according to claim 1, in which the mineral filler is talc.

6. A composition according to claim 1, in which the polytetrafluoroethylene is microfibrillar.

7. A composition according to claim 1, which contains from 0.1 to 10 parts of the polytetrafluoroethylene resin.

8. A composition according to claim 1, which comprises the polyphenylene ether resin and impact modifier in a weight ratio of from 25:1 to 1:2.

9. A composition according to claim 1, which contains from 40 to 60% of mineral filler based on the total weight of the composition.

10. A composition according to claim 1, which further includes a plasticizer and/or flame retardant.

11. A composition according to claim 10, which contains triphenyl phosphate.

12. A thermoplastic composition, comprising an intimate admixture of
   (a) a blend of a polyphenylene ether resin, an impact modifier and talc, the talc being present in an amount of at least about 40 percent by weight, based on the total weight of the composition; and
   (b) a notched Izod impact strength enhancing amount of a polytetrafluoroethylene resin.

* * * * *